3,541,070
SINTERED POLYTETRAFLUOROETHYLENE JOINT SEALING RIBBON

Robert B. Ahrabi, Lafayette, La., assignor to Oil Center Research, Inc., a corporation of Louisiana
No Drawing. Filed Mar. 30, 1967, Ser. No. 626,973
Int. Cl. C08f 3/24
U.S. Cl. 260—92.1                                    11 Claims

ABSTRACT OF THE DISCLOSURE

A joint sealing ribbon formed primarily of unsintered polytetrafluoroethylene and including sintered polytetrafluoroethylene particles to provide resistance to cold flow without precluding sufficient flow of the ribbon to effectively seal subsequently occurring leaks in the joint initially sealed.

---

This invention relates to a joint sealing article, such as in the form of an elongated ribbon, which may be wrapped circumferentially around the male threads of a joint comprising a portion of a male and a female threaded joint. More particularly, the present invention relates to a polytetrafluoroethylene ribbon adapted to occupy space existing between male and female fittings when the fittings are joined together and to also flow in a controlled manner, to seal subsequently occurring spaces between the male and female fittings.

More specifically, the present invention contemplates the provision of a polytetrafluoroethylene joint sealing ribbon primarily formed of unsintered polytetrafluoroethylene and containing sufficient amounts of sintered polytetrafluoroethylene particles so as to modify the cold-flow characteristics of the ribbon.

Unsintered polytetrafluoroethylene ribbons have been proposed heretofore for the circumferential wrapping of the threads of a male fitting in a threaded joint comprising mating male and female fittings. However, it has been found that such a sealing ribbon generally fails to satisfactorily seal connections which are subjected to stress and strain. Utilization of such a sealing ribbon on worn and corroded threads, as well as threaded connections where relatively large clearances existed between the mated fittings, has shown that where a leaking passageway occurs or is subsequently formed the polytetrafluoroethylene ribbon tends to flow through the opening thereby exhibiting little if any resealing capability. Leaks of this nature were not confined to high pressure applications but also occurred repeatedly in low pressure applications.

Accordingly, it will be appreciated that the use of polytetrafluoroethylene ribbons has resulted from its susceptibility to "cold flow" under compressed and tensile loads, and its resulting lack of form stability under these conditions. This tendency for the material to yield has been alleviated in the past by the use of fillers such as glass fiber, boron nitride, etc. However, modification of the pure polytetrafluoroethylene gives rise to a number of other problems among which is that such fillers add abrasive qualities to a composition which normally exhibits a high degree of lubricity. The fillers also tend to lower the tensile strength of the modified polytetrafluoroethylene below that exhibited by pure polytetrafluoroethylene. In addition, it has been proposed heretofore to provide composite laminates of sintered and unsintered polytetrafluoroethylene films wherein a substrate of sintered polytetrafluoroethylene is coated with a dispersion of unsintered polytetrafluoroethylene which is subsequently cured below the crystalline transition temperature of polytetrafluoroethylene, i.e., approximately 620° F. However, from the foregoing it will be appreciated that the continuous sintered polytetrafluoroethylene substrate severely reduces the cold flow of the composite film so as to render it somewhat unsatisfactory for the purposes disclosed herein.

The present invention provides a means of overcoming the disadvantages inherent in polytetrafluoroethylene sealing ribbons proposed heretofore by mechanically incorporating with an unsintered polytetrafluoroethylene substrate sintered polytetrafluoroethylene particles which have the capability of migrating from the unsintered substrate to occlude or block gaps initially present between threaded fittings, for example, or block and thus seal leaks which develop subsequent to the initial make-up of the fittings.

Raw or virgin unsintered polytetrafluoroethylene resins are processed by various well known methods to produce "sintered" resins. While these methods are somewhat diverse, the general technique embodies three basic steps. First, the resin is cold pressed or preformed under a high pressure; second, the resin is sintered by heating the preform above the gel point, i.e. 620° F., in order to achieve cohesion among the particles and alter the crystal construction thereof; and third cooling the sintered sample to achieve a desired crystallinity. During this process as is well known to the art, the unsintered polytetrafluoroethylene undergoes a change in properties wherein density, compressive and tensile strength, resistance to deformation and cold flow, are altered, wherein, and is particularly significant to the practice of the present invention, the sintered polytetrafluoroethylene exhibits a greater resistance to cold flow than the unsintered polytetrafluoroethylene. A sintered resin having a specific gravity within the range from 2.1 to 2.2 is produced in this manner. The sintered polytetrafluoroethylene resin so produced is reduced to a particulate form such as by grinding, flaking, impact milling, chopping, etc. and is generally, although not necessarily, reduced to a size corresponding to 80 mesh Tyler Standard although it will be appreciated that this is merely exemplary and that the mesh of the sintered particulate polytetrafluoroethylene is primarily determined by the maximum dimension it is anticipated that the particles must bridge to effect a seal.

While it is not wished to be restricted to a particular method of producing a sealing ribbon in accordance with the principles of the present invention exemplary modes of producing such a ribbon include applying an appropriate amount of particulate sintered polytetrafluoroethylene to an unsintered polytetrafluoroethylene ribbon and then subjecting the coated ribbon to a calendering so as to force the particles into the substrate.

Alternatively, particulate sintered polytetrafluoroethylene may be premixed with proper amounts of unsintered polytetrafluoroethylene and formed into a composite sealing ribbon by a conventional extrusion procedure whereby suspension of the particles in a suitable extrusion aid i.e. a polyisobutylenenaptha being careful, as indicated hereinabove, to avoid the generation of temperatures in excess of approximately 620° F. which would of course produce a fully sintered ribbon unsuitable for the practice of the present invention. The particulate sintered polytetrafluoroethylene may be incorporated in amounts of approximately 1% to 90% by weight of the unsintered portion of the ribbon and preferably, although not necessarily, within the range of approximately 10% to 30% of the unsintered substrate wherein, as indicated hereinabove, the mesh of the sintered particles, thickness of the finished tape, width of the tape are dependent upon the dimensions of the voids in the joint to be sealed.

The following examples are included to more specifically illustrate the practice of the present invention.

EXAMPLE I

A commercially available unsintered polytetrafluoroethylene ribbon of between 1 and 20 mils. in thickness was sprayed with 30% by weight of particulate polytetrafluoroethylene, such as sintered in a manner discussed hereinabove, which sintered particles were 80 mesh and finer Tyler Standard. The sintered particle coated-unsintered ribbon was then subject to calendering to mechanically force the sintered particles into the surface of the unsintered ribbon. The ribbon so produced was tested by circumferentially wrapping the male threads of the male portion of a 2⅞ inch threaded pipe joint wherein approximately 50% of the male threads were removed to dramatically test the capabilities of the sealing ribbon. Conventional test apparatus was utilized to subject the joint to an internal pressure of 10,000 p.s.i. and no leaking occurred. The unsintered ribbon substrate, without the addition of sintered polytetrafluoroethylene particles was subjected to the same conditions indicated hereinabove and it was noted that leaking of the joints, in several test runs, occurred when the joint was subjected to between 2,000 and 4,000 p.s.i. From the foregoing, it will be appreciated that the sealing ribbon of the present invention can increase the sealing capability of a polytetrafluoroethylene ribbon by more than 50%.

EXAMPLE II

A particulate sintered polytetrafluoroethylene containing joint sealing ribbon was prepared by admixing ten parts by weight of sintered polytetrafluoroethylene particles of approximately 80 mesh Tyler Standard with 90 parts by weight of unsintered polytetrafluoroethylene which admixture of polytetrafluoroethylene was combined with a suitable amount of an extrusion aide and subsequently formed under non-sintering pressures and temperatures into a sealing ribbon of approximately 1 to 20 mils. in thickness, followed by the volatization of the extrusion aid so as to provide an unsintered polytetrafluoroethylene ribbon having mechanically incorporated sintered polytetrafluoroethylene particles therein capable of migrating to effectively seal the joints within which the composite ribbon is utilized. In use, the ribbon produced exhibited substantially the same sealing capability as the ribbon produced in accordance with the Example I.

EXAMPLE III

A sealing ribbon was prepared as set forth in Example I with the exception that the proportion of sintered polytetrafluoroethylene particles was reduced to approximately 1% by weight of the unsintered polytetrafluoroethylene substrate ribbon and comparative tests conducted to determine the sealing capability of the composite ribbon over that of the pure unsintered polytetrafluoroethylene. While not capable of withstanding as great a pressure as set forth in Example I the composite tape was capable of withstanding substantially greater pressures, without leaking, than pure unsintered tape.

The foregoing is considered as illustrative only of the principles of the invention. Further, since numerous modifications and changes will readily occur to those skilled in the art, it is not desired to limit the invention to the exact method, operation and product shown and described, and accordingly all suitable modifications and equivalents may be resorted to falling within the scope of the invention as claimed.

What is claimed as new is as follows:

1. A joint sealing ribbon comprising a web of coherent unsintered polytetrafluoroethylene having discrete particles of sintered polytetrafluoroethylene incorporated therein.

2. The sealing ribbon of claim 1 wherein said sintered polytetrafluoroethylene particles comprise about 1% to 90% by weight of the unsintered polytetrafluoroethylene web.

3. The sealing ribbon of claim 1 wherein said unsintered polytetrafluoroethylene web has not been subjected to temperatures in excess of about 620° F. and said sintered polytetrafluoroethylene particles have been subjected to temperatures in excess of about 620° F.

4. The sealing ribbon of claim 1 wherein said sintered polytetrafluoroethylene particles are pressed into said unsintered web.

5. The sealing ribbon of claim 1 wherein said sintered polytetrafluoroethylene particles are admixed with an unsintered precursor of said unsintered web prior to forming of the web.

6. In combination with a threaded joint and the like a seal member adapted to be interposed between complementary portions of the threaded joint to sealingly compensate for voids existing therebetween, said seal member comprising a polytetrafluoroethylene sealing ribbon, said sealing ribbon having a coherent unsintered polytetrafluoroethylene web having discrete particles of sintered polytetrafluoroethylene incorporated therein sized so as to be capable of bridging the voids between the complementary portions.

7. The combination of claim 6 wherein said sintered polytetrafluoroethylene particles comprise about 1% to 90% by weight of the unsintered polytetrafluoroethylene web.

8. The combination of claim 6 wherein said unsintered polytetrafluoroethylene web has not been subjected to temperatures in excess of about 620° F. and said sintered polytetrafluoroethylene particles have been subjected to temperatures in excess of about 620° F.

9. The combination of claim 6 wherein said sintered polytetrafluoroethylene particles are pressed into said unsintered web.

10. The combination of claim 6 wherein said sintered polytetrafluoroethylene particles are admixed with an unsintered precursor of said unsintered web prior to forming of the web.

11. The sealing ribbon of claim 1 wherein said sintered polytetrafluoroethylene particles comprise about 10% to 30% by weight of the unsintered polytetrafluoroethylene web, said sintered polytetrafluoroethylene particles having a particle size of approximately 80 mesh and finer Tyler Standard.

References Cited
UNITED STATES PATENTS

| | | | |
|---|---|---|---|
| 2,485,691 | 10/1949 | Bogese | 264—174 |
| 3,002,770 | 10/1961 | Chesnut et al. | 277—170 |
| 3,369,817 | 2/1968 | Bandy et al. | 277—170 |

JOSEPH L. SCHOFER, Primary Examiner

J. A. DONAHUE, Jr., Assistant Examiner

U.S. Cl. X.R.

161—189; 277—170